UNITED STATES PATENT OFFICE 2,386,351

TREATMENT OF HYDROCARBONS

Walter A. Schulze, Bartlesville, Okla., assignor to Phillips Petroleum Company, a corporation of Delaware No Drawing. Application September 3, 1940,
Serial No. 355,258

6 Claims. (Cl. 260—680)

This invention relates to the purification of unsaturated hydrocarbons produced by the thermal and/or catalytic treatment of suitable hydrocarbon raw materials. More specifically, this invention relates to the purification of the mono-olefin and/or diolefin extracts and the corresponding residua from mixtures produced by the thermal or catalytic treatment of petroleum fractions or hydrocarbon stocks from any source.

In a still more specific sense, this invention concerns the purification of said components of hydrocarbon mixtures subsequent to chemical absorption treatment for the segregation of diolefins and prior to further processing in which the impurities so removed would be detrimental.

Various processes for the production of diolefins and particularly of butadiene have been proposed. These include the thermal cracking of petroleum fractions and higher molecular weight hydrocarbons of aliphatic or cyclic nature as well as the catalytic dehydrogenation of paraffins and/or olefins of the same number of carbon atoms. Such processes involve the production and segregation of hydrocarbon mixtures which may contain, in addition to the desired diolefins, paraffins, mono-olefins and other unsaturates of the same or a smaller number of carbon atoms and often of approximately the same boiling range.

The extraction and recovery of diolefins from mixtures of the type described has been attempted by methods such as solvent extraction, chemical separation and the like. Chemical separation processes have proposed the use of solutions of salts of certain heavy metals of groups 1 and 2 of the periodic system and particularly of solutions of cuprous halides. Such cuprous salt solutions function through the formation of addition compounds with unsaturated hydrocarbons according to the following proposed equations:

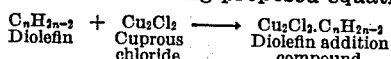

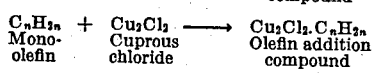

The diolefin addition compounds are formed under conditions such that they are solids, while the olefin compounds remain in solution in the extracting medium. The diolefin may then be recovered by separation of the solid product and by heating same to relatively moderate decomposition temperatures.

The described methods of absorbing unsaturates by the use of cuprous halide solutions have been directed to treating gaseous hydrocarbon mixtures. More recently, it has been found possible to accomplish diolefin absorption and recovery by means of solid-type reagents comprising adsorbent carriers impregnated with suitable metal salts and/or solutions thereof which produce and retain the diolefin addition compound during contact with hydrocarbon fluids. In processes utilizing such solid reagents as described in copending application Serial No. 354,086, filed August 24, 1940, the hydrocarbon may be in either liquid or vapor phase although liquid phase operation is preferred because of distinct advantages regarding operating flexibility and costs and the size of plant equipment.

In liquid phase absorption of unsaturates with cuprous halide solutions or with solid cuprous halide reagents, it has been found that the abovementioned olefin and diolefin addition compounds have a definite solubility in the hydrocarbon phase, depending on the temperature of absorption and the composition of the hydrocarbon liquid. Apparently, under the conditions favorable to the formation of solid diolefin addition compounds either or both of the addition products are retained in solution to some extent in the liquid residuum and carried away from the cuprous halide reagent. In certain cases $C_4$ hydrocarbon liquids after passage over a cuprous chloride reagent for the removal of butadiene have shown appreciable amounts of copper salt residue on evaporation.

Copper contamination as a result of the chemical separation process is extremely undesirable since it interferes wth subsequent treatment of both the diolefin extract and the residuum. This is particularly true of those cyclic processes wherein the residuum from the diolefin extraction step is recycled for further conversion and production of diolefins. For example, the presence of copper in a butene-butane stock being recycled to a thermal or catalytic conversion operation to produce butadiene cannot be tolerated because of the catalytic effect of the copper on decomposition and polymerization reactions with consequent loss of valuable charging stock.

The undesirable consequences of copper contamination are also extended to those processes in which cuprous halide reagents are used to segregate mono-olefins from paraffin-olefin hydrocarbon mixtures. Thus, in processes for the separation of butenes from butene-butane mixtures, copper compounds may be retained by the butane residuum from the separation process and exert harmful effects in further dehydrogenation or conversion of the paraffinic material.

The extent of contamination of a diolefin extract by copper compounds is less serious due to the sequence of desorbing operations which normally evolve the hydrocarbon in vapor phase from the solid cuprous halide addition product. Proper control of mechanical operations may be adequate in preventing copper carryover in said operations except in cases of mixed phase desorption or of the use of a liquid desorption agent.

The exact nature of the copper compounds retained by hydrocarbon liquids following contact with cuprous salt reagents under the above-mentioned conditions is not known. It is assumed that both the olefin and diolefin addition compounds are present although the former may predominate on the basis of greater overall solubility in various solvents. The types of copper compounds are limited to those formed with unsaturated hydrocarbons since no other salt-forming components are present in the hydrocarbon liquids undergoing treatment.

I have now discovered a method of purification of hydrocarbon liquids of the type described subsequent to treatment with cuprous halide reagents whereby the retained copper compounds are removed and the harmful after-effects of copper contamination are eliminated. My method of purification depends on the conversion of soluble unsaturated hydrocarbon-cuprous halide compounds to insoluble inorganic copper salts which are removed from the purified hydrocarbon liquid.

I have found that when the liquid hydrocarbon residuum from the treatment with a cuprous halide reagent is passed over a solid reagent consisting of an adsorbent carrier impregnated with an alkaline sulfide or an aqueous solution thereof that the cuprous halide addition compounds of unsaturated hydrocarbons are decomposed with the formation of insoluble copper sulfide. The copper sulfide precipitate thus formed is retained by the solid reagent, and the purified hydrocarbon is recovered substantially free of copper.

The alkaline sulfides which I may use in preparing sulfide-impregnated reagents are in general those having a water solubility greater than that of copper sulfide and which have no deteriorative effect on the hydrocarbon liquid. In practice it is usually convenient to prepare solid reagents by spraying or otherwise wetting an adsorbent material such as fuller's earth, charcoal, pumice and the like with an aqueous solution of suitable concentration of a water-soluble sulfide of the alkali and/or alkaline earth metals. Such reagent preparations are controlled to produce a reagent consisting of 1-50 per cent by weight of alkaline sulfide. Since the purification reaction requires the presence of water, the solid reagents are never dried to anhydrous condition, although partial drying may be employed in producing high weight percentages of alkaline sulfide on a carrier without exceeding the adsorptive capacity of said carrier for water of solution. Transfer of aqueous solution from the reagent to the hydrocarbon liquid is undesirable.

The use of aqueous sulfide solutions to purify unsaturated hydrocarbons containing cuprous halide addition compounds has been described in my copending application, Serial No. 355,257, filed September 3, 1940. However, I have found that certain advantages can be realized by treating with solid-type reagents according to the present disclosure.

By use of a solid reagent the hydrocarbon liquid may be passed by filtration over a bed of the granular material, and means for mixing immiscible liquids are thus unnecessary. Also, the water-insoluble copper sulfide formed by the purification process is retained by the reagent, and means for separating entrained aqueous solutions and/or suspended solids from the purified hydrocarbon liquid may be dispensed with.

Further, longer contact time may be obtained in filtering the hydrocarbon liquid over a solid reagent than is possible when the purification is effected by means of reagent solutions. In the filtration process, true counter-current treating is obtained, and the solid reagent is gradually and uniformly spent in the direction of hydrocarbon flow. This condition may not be obtained in the use of aqueous solutions since the entire volume of solution is spent to the same degree.

The temperatures which are suitable for the operation of my process are ordinary atmospheric temperatures of 40 to 110° F. The higher temperatures are favorable to rapid reaction, but should not be carried high enough to cause dehydration of the solid reagent.

The pressures required are low superatmospheric pressures usually between 50 and 500 pounds gage and sufficient to maintain the hydrocarbon in liquid phase at treating temperatures.

The hydrocarbon liquids which are treated according to the terms of my invention are the products of convertive reactions conducted under severe conditions for producing a high degree of unsaturation. Said liquids are of closely regulated composition and the control of composition, fractionation and conversion are designed to promote high yields and efficient utilization of raw materials. Under these conditions, impurities of the nature of sulfur, nitrogen and oxygen compounds are substantially absent from the raw materials, or are removed during or subsequent to the convertive reactions. In catalytic dehydrogenation and thermal cracking at temperatures above 1000° F. for example, sulfur compounds are converted to hydrogen sulfide and removed from the hydrocarbon vapors prior to the segregation of stocks for the extraction of diolefins. Oxygen compounds, if present, are similarly removed by the reduction in the hydrogen atmosphere of the convertive reactions. Organic nitrogen impurities are totally absent. Thus, the stocks to be purified following the extraction of diolefins contain no compounds capable of combining with copper except the unsaturated hydrocarbons.

The following examples will illustrate specific applications of my process to the purification of unsaturated hydrocarbons.

*Example I*

A butane-butene stock segregated from the products of the dehydrogenation of n-butane was catalytically dehydrogenated and the effluent vapors were deethanized and condensed. The resulting $C_3$—$C_4$ liquid was treated over a solid reagent consisting of bauxite impregnated with cuprous chloride for the extraction of butadiene. The residuum from this extraction which was to be recycled to the dehydrogenation step was contaminated with cuprous chloride addition compounds of unsaturated hydrocarbons.

The copper-containing liquid was passed over a reagent consisting of fuller's earth impregnated with 10 weight per cent of sodium sulfide at a flow rate of 1 liquid volume per hour per volume of reagent. The purified liquid was free of copper and was recycled to the dehydrogenation step.

*Example II*

Normal butane was dehydrogenated to produce butenes, and the butenes were concentrated by treating the dehydrogenated liquid with a solution of cuprous chloride. The residuum from the butene concentration contained sufficient cuprous chloride-olefin addition product to give a copper salt residue on evaporation. This liquid was passed over a solid reagent consisting of charcoal impregnated with 30 per cent by weight of sodium sulfide solution, and after this treatment the liquid was copper-free and suitable for recycle to the dehydrogenation operation.

While the foregoing disclosure and examples have illustrated the invention and described some specific applications thereof, other modifications will be obvious to those skilled in the art according to the principles outlined. The scope of my invention, therefore, is limited only by the appended claims.

I claim:

1. A process for the manufacture and recovery of diolefins which comprises converting a hydrocarbon feed at least partially to diolefins under conditions producing unsaturation, contacting a low-boiling hydrocarbon stream in liquid phase and containing the diolefin content of the conversion effluent together with other non-diolefin hydrocarbons with a reagent comprising a solid adsorbent carrier impregnated with a cuprous halide under such conditions as to effect absorption of substantially all of the diolefins by formation of an addition compound with said cuprous halide, contacting the substantially diolefin-free residuum containing dissolved cuprous halide addition products of unsaturated hydrocarbons with a reagent comprising a solid adsorbent carrier impregnated with an alkaline sulfide whereby said dissolved addition products are decomposed with the formation of copper sulfide and liberation of said unsaturated compounds, and recycling the purified residuum to said converting step for further conversion to diolefins.

2. A process for the production of butadiene which comprises dehydrogenating an aliphatic C₄ butadiene-yielding hydrocarbon to produce an effluent containing butenes and butadiene, extracting the butadiene from a stream comprising said butenes and butadiene by contacting same in liquid phase with a cuprous halide reagent, contacting the residuum from the cuprous halide treatment with a solid reagent comprising an adsorbent carrier impregnated with an alkaline sulfide for the decomposition of any cuprous halide-unsaturated hydrocarbons addition product and separating copper sulfide formed thereby, and recycling the purified residuum for further dehydrogenation.

3. A process for the removal of diolefins from substantially sulfur-free diolefin-containing low-boiling hydrocarbon fluids which are the products of convertive reactions producing unsaturation and forming said diolefins which comprises contacting said hydrocarbon fluids in liquid form with a cuprous halide reagent to substantially completely remove said diolefins by formation of an essentially insoluble addition compound with said cuprous halide, the residuum liquid containing dissolved hydrocarbon-soluble cuprous halide addition products of unsaturated hydrocarbons, removing said addition products from said residuum by directly contacting said residuum with a solid reagent comprising an adsorbent carrier impregnated with an inorganic sulfide more soluble than copper sulfide, thereby decomposing said addition products with the liberation of the unsaturated hydrocarbons and formation of copper sulfide, and separating the purified residuum liquid from the copper sulfide.

4. A process for the production of butadiene which comprises dehydrogenating an aliphatic C₄ butadiene-yielding hydrocarbon to produce an effluent containing butenes and butadiene, extracting the butadiene from a stream comprising said butenes and butadiene by contacting same in liquid phase with a cuprous chloride reagent, contacting the residuum from the cuprous chloride treatment with a solid reagent comprising an adsorbent carrier impregnated with an alkaline sulfide for the decomposition of any cuprous chloride-unsaturated hydrocarbon addition product and separating copper sulfide formed thereby, and recycling the purified residuum for further dehydrogenation.

5. The process of claim 3 in which the inorganic sulfide is sodium sulfide.

6. The process of claim 3 in which the inorganic sulfide was applied to said carrier in the form of an aqueous solution of sodium sulfide.

WALTER A. SCHULZE.